(12) United States Patent
Schneider

(10) Patent No.: US 8,429,648 B2
(45) Date of Patent: Apr. 23, 2013

(54) METHOD AND APPARATUS TO SERVICE A SOFTWARE GENERATED TRAP RECEIVED BY A VIRTUAL MACHINE MONITOR

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 799 days.

(21) Appl. No.: 12/474,214

(22) Filed: May 28, 2009

(65) Prior Publication Data
US 2010/0306766 A1 Dec. 2, 2010

(51) Int. Cl.
*G06F 9/455* (2006.01)
*G06F 17/00* (2006.01)

(52) U.S. Cl.
USPC .................................. 718/1; 726/1

(58) Field of Classification Search ........... 718/1; 726/1
See application file for complete search history.

(56) References Cited

U.S. PATENT DOCUMENTS

| | | | |
|---|---|---|---|
| 6,397,242 B1* | 5/2002 | Devine et al. ............. | 718/1 |
| 6,658,571 B1 | 12/2003 | O'Brien et al. | |
| 6,785,886 B1* | 8/2004 | Lim et al. ............... | 718/1 |
| 7,219,354 B1 | 5/2007 | Huang et al. | |
| 7,971,255 B1 | 6/2011 | Kc et al. | |
| 2004/0064813 A1* | 4/2004 | Neiger et al. ............. | 718/1 |
| 2005/0076324 A1* | 4/2005 | Lowell et al. ............ | 717/100 |
| 2005/0257243 A1 | 11/2005 | Baker | |
| 2006/0075464 A1 | 4/2006 | Golan et al. | |
| 2007/0006228 A1* | 1/2007 | Grobman et al. ........... | 718/1 |
| 2007/0199045 A1 | 8/2007 | Kime et al. | |
| 2007/0300219 A1* | 12/2007 | Devaux ................... | 718/1 |
| 2008/0163211 A1 | 7/2008 | Mizuno | |
| 2008/0244096 A1 | 10/2008 | Springfield et al. | |
| 2008/0313730 A1 | 12/2008 | Iftimie et al. | |
| 2009/0125974 A1* | 5/2009 | Zhang et al. ............. | 726/1 |
| 2009/0150510 A1 | 6/2009 | Kovacs et al. | |
| 2009/0259798 A1 | 10/2009 | Fischer | |
| 2010/0161978 A1 | 6/2010 | Bacher | |
| 2010/0218201 A1 | 8/2010 | Schneider | |
| 2010/0306766 A1* | 12/2010 | Schneider ................. | 718/1 |
| 2010/0306769 A1 | 12/2010 | Schneider | |

OTHER PUBLICATIONS

Watson, R.N.M., "Exploiting Concurrency Vulnerabilities in System Call Wrappers", WOOT '07 First USENIX Workshop on Offensive Technologies, Aug. 6-10, 2007, Boston, 8 pages.
Wikipedia, "System Call", last modified: Jan. 19, 2009, accessed at: http://en.wikipedia.org/wiki/System_call, accessed on: Jan. 28, 2009, 3 pages.
Wikipedia, "Kernel (computing)", last modified: Jan. 26, 2009, accessed at: http://en.wikipedia.org/wiki/Kernel_(computer_science), accessed on: Jan. 28, 2009, 18 pages.

(Continued)

*Primary Examiner* — Thomas Lee
*Assistant Examiner* — Terrell Johnson
(74) *Attorney, Agent, or Firm* — Lowenstein Sandler LLP

(57) ABSTRACT

A software generated trap is received by a virtual machine monitor running on a computer system, wherein the software generated trap was caused by a process or a guest operating system of a virtual machine hosted by the computer system. The virtual machine monitor performs a service in response to receiving the software generated trap.

27 Claims, 13 Drawing Sheets

OTHER PUBLICATIONS

Timothy Fraser, Lee Badger, Mark Feldman; Hardening COTS software with generic software wrappers; Security and Privacy, 1999. Proceedings of the 1999 IEEE Symposium; Issue date 1999; pp. 2-16.
Office Action for U.S. Appl. No. 12/475,321 mailed Sep. 23, 2011.
Office Action for U.S. Appl. No. 12/393,997, mailed Nov. 18, 2011.
Office Action for U.S. Appl. No. 12/475,321 mailed Apr. 11, 2012.
Office Action for U.S. Appl. No. 12/393,997, mailed Apr. 25, 2012.

* cited by examiner

| System Call Symbol | Windows NT | | | | Windows XP | | | Vista |
|---|---|---|---|---|---|---|---|---|
| | SP3 | SP4 | SP5 | SP6 | SP0 | SP1 | SP2 | SP0 |
| NtAcceptConnectPort | 0x0000 | 0x0000 | 0x0000 | 0x0000 | 0x0000 | 0x0000 | 0x0000 | 0x0000 |
| NtAccessCheck | 0x0001 | 0x0001 | 0x0001 | 0x0001 | 0x0001 | 0x0001 | 0x0001 | 0x0001 |
| NtAccessCheckAndAuditAlarm | 0x0002 | 0x0002 | 0x0002 | 0x0002 | 0x0002 | 0x0002 | 0x0002 | 0x0002 |
| NtAccessCheckByType | | | | | 0x0003 | 0x0003 | 0x0003 | 0x0003 |
| NtAccessCheckByTypeAndAuditAlarm | | | | | 0x0004 | 0x0004 | 0x0004 | 0x0004 |
| NtAccessCheckByTypeResultList | | | | | 0x0005 | 0x0005 | 0x0005 | 0x0005 |
| NtAccessCheckByTypeResultListAndAuditAlarm | | | | | 0x0006 | 0x0006 | 0x0006 | 0x0006 |
| NtAccessCheckByTypeResultListAndAuditAlarmByHandle | | | | | 0x0007 | 0x0007 | 0x0007 | 0x0007 |
| NtAddAtom | 0x0003 | 0x0003 | 0x0003 | 0x0003 | 0x0008 | 0x0008 | 0x0008 | 0x0008 |
| NtAddBootEntry | | | | | 0x0009 | 0x0009 | 0x0009 | 0x0009 |
| NtAddDriverEntry | | | | | | | | 0x000a |
| NtAdjustGroupsToken | 0x0004 | 0x0004 | 0x0004 | 0x0004 | 0x000a | 0x000a | 0x000a | 0x000b |
| NtAdjustPrivilegesToken | 0x0005 | 0x0005 | 0x0005 | 0x0005 | 0x000b | 0x000b | 0x000b | 0x000c |
| NtAlertResumeThread | 0x0006 | 0x0006 | 0x0006 | 0x0006 | 0x000c | 0x000c | 0x000c | 0x000d |
| NtAlertThread | 0x0007 | 0x0007 | 0x0007 | 0x0007 | 0x000d | 0x000d | 0x000d | 0x000e |
| NtAllocateLocallyUniqueId | 0x0008 | 0x0008 | 0x0008 | 0x0008 | 0x000e | 0x000e | 0x000e | 0x000f |
| NtAllocateUserPhysicalPages | | | | | 0x000f | 0x000f | 0x000f | 0x0010 |
| NtAllocateUuids | 0x0009 | 0x0009 | 0x0009 | 0x0009 | 0x0010 | 0x0010 | 0x0010 | 0x0011 |
| NtAllocateVirtualMemory | 0x000a | 0x000a | 0x000a | 0x000a | 0x0011 | 0x0011 | 0x0011 | 0x0012 |
| NtAlpcAcceptConnectPort | | | | | | | | 0x0013 |
| NtAlpcCancelMessage | | | | | | | | 0x0014 |
| NtAlpcConnectPort | | | | | | | | 0x0015 |
| NtAlpcCreatePort | | | | | | | | 0x0016 |
| NtAlpcCreatePortSection | | | | | | | | 0x0017 |
| NtAlpcCreateResourceReserve | | | | | | | | 0x0018 |
| NtAlpcCreateSectionView | | | | | | | | 0x0019 |
| NtAlpcCreateSecurityContext | | | | | | | | 0x001a |
| NtAlpcDeletePortSection | | | | | | | | 0x001b |
| NtAlpcDeleteResourceReserve | | | | | | | | 0x001c |
| NtAlpcDeleteSectionView | | | | | | | | 0x001d |
| NtAlpcDeleteSecurityContext | | | | | | | | 0x001e |

FIG. 4B

METHOD AND APPARATUS TO SERVICE A SOFTWARE GENERATED TRAP RECEIVED BY A VIRTUAL MACHINE MONITOR

TECHNICAL FIELD

Embodiments of the present invention relate to virtualized systems, and more specifically to virtual machine monitors that apply aspects to add functionality to guest operating systems.

BACKGROUND

Modern computer programs are typically created using modular programming approaches in which the various functions of a computer program are divided into interdependent modules. Each module is a component of a program that performs a specific set of related behaviors. Examples of such modular programming approaches include object oriented programming (e.g., Java, C++, etc.), where programs are structured as collections of interrelated objects, and functional programming (e.g., Mathematica, Extensible Stylesheet Language Transformations (XSLT), etc.), where programs are structured as collections of mathematical functions.

Modular programming approaches are adept at modularizing design features that can be cleanly divided. However, design features that cannot be cleanly divided (e.g., where the same or similar functionality affects multiple different concerns) cannot typically be modularized. These design features are said to be crosscutting concerns, and occur when a concern depends on and/or must affect parts of the implementation of several distinct modules. A concern is a set of behaviors needed to perform a specific feature of a computer program, which has been implemented in a code structure. Concerns can be divided into core concerns and crosscutting concerns. A core concern is a concern that performs operations that relate to the main domain, or responsibility, of a module. These operations may be referred to as core operations. Core concerns are often referred to as business concerns. A crosscutting concern is a concern that spans multiple modules (e.g., that cannot be completely separated from other concerns). A crosscutting concern typically affects multiple core concerns. Examples of crosscutting concerns include security, data logging, session management, authentication, etc.

Implementing crosscutting concerns in traditional programming languages typically requires the same or similar bits of code throughout the program, resulting in code that is tangled and/or scattered. For example, by its nature a security concern cuts across, and must be uniformly applied to, many of the natural units of modularity of a computer program. Because the security concern cuts across multiple modules, it isn't reusable, can't be refined or inherited, and is spread throughout the program in an undisciplined manner.

Aspect oriented programming (AOP) is a programming approach that was developed to address the limited manageability of crosscutting concerns in conventional programming approaches. An aspect includes a concern that crosscuts the primary modularization of a program. An aspect oriented programming language encapsulates crosscutting concerns in a number of special purpose program modules called aspects, rather than spreading the implementation of such concerns throughout the modules that include core concerns of a program. An aspect is the unit of modularity for crosscutting concerns, and includes a pointcut and advice. A pointcut is program code that picks out certain join points (a clearly definable point in a program flow, examples of which include method calls, exception throws, etc.) and values at those points. Advice is code (e.g., one or more operations) that can be executed when a join point is reached. Advice can define crosscutting functionality that transparently forces a modification to a core concern or adds additional functionality to a core concern. Advice is divided into before advice and after advice. Before advice is advice that runs as a join point is reached, before the program proceeds with the join point. After advice is advice that runs after the program proceeds with the join point.

Aspects can be applied to modules in well defined ways. For example, an aspect applied to a program constructed using an object oriented approach can affect the implementation of several classes (or several methods within a single class) in a clean, principled manner. Aspects can be applied externally by specialized loaders. However, aspects as applied externally by specialized loaders are limited to where the aspects can be applied.

BRIEF DESCRIPTION OF THE DRAWINGS

The present invention is illustrated by way of example, and not by way of limitation, and can be more fully understood with reference to the following detailed description when considered in connection with the figures in which:

FIG. 4B illustrates a partial table of Windows system calls that shows whether system calls are available for different versions of Windows NT, Windows XP and Windows Vista;

DETAILED DESCRIPTION

Figure 1:
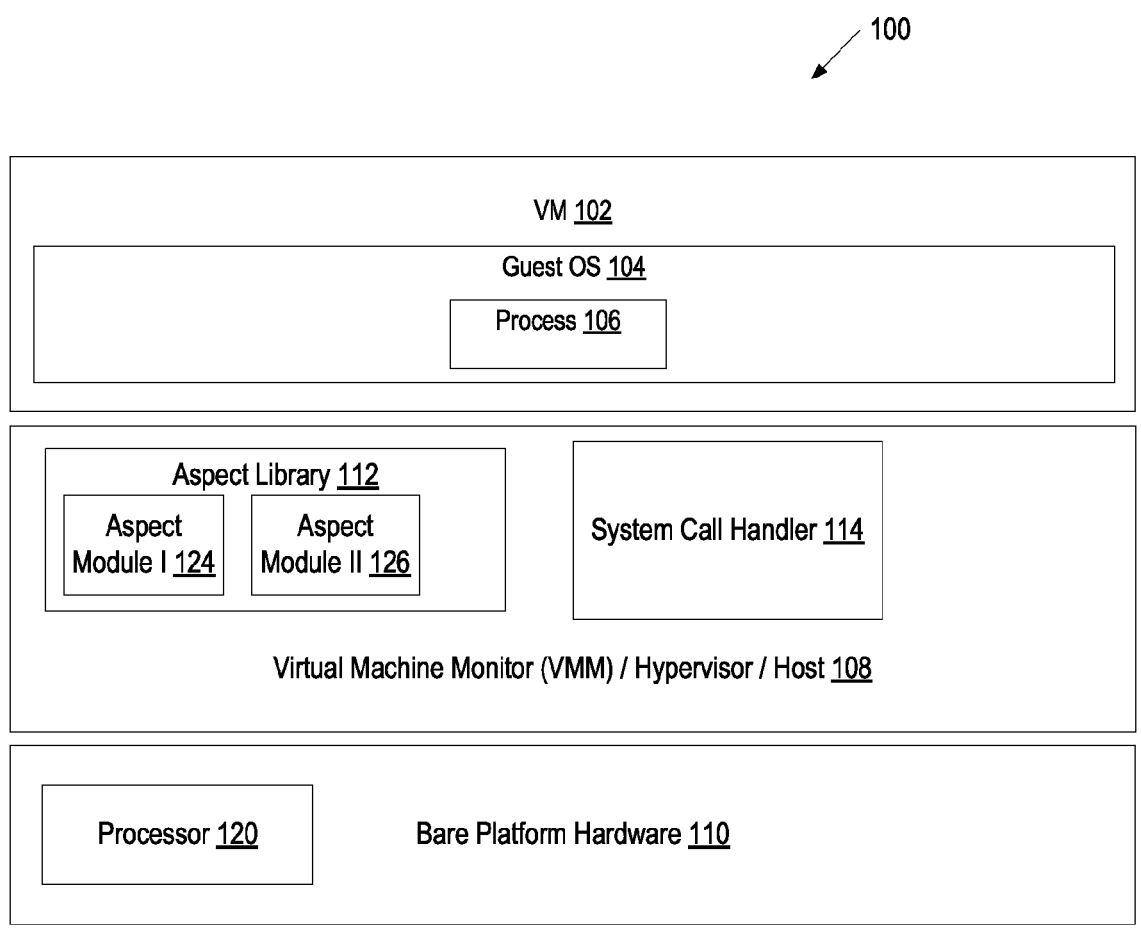
FIG. 1 illustrates a computing device, in accordance with one embodiment of the present invention.

Described herein is a method and system for adding functionality to guest operating systems by virtual machine monitors. Described herein is also a method and system for applying aspects to virtual machine monitors. In one embodiment, a software generated trap is received by a virtual machine monitor running on a computer system, wherein the software generated trap was caused by a process or a guest operating system of a virtual machine hosted by the computer system. In one embodiment, the software generated trap is caused by a system call issued by the process. Alternatively, the software generated trap may be caused by an attempt of the process or the guest operating system to execute a privileged or illegal instruction. The virtual machine monitor performs a service in response to receiving the software generated trap. In one embodiment, performing the service includes invoking an aspect, the aspect comprising a separate unit of execution from the virtual machine monitor.

In one embodiment, in which the software generated trap is caused by a system call, the virtual machine monitor determines whether the system call is fully managed by the virtual machine monitor, partially managed by the virtual machine monitor, or not managed by the virtual machine monitor. If the system call is fully managed by the virtual machine monitor, the virtual machine monitor executes instructions identified by the system call to generate a result. The result can then be returned to the process. If the system call is not managed by the virtual machine monitor or partially managed by the virtual machine monitor, the system call may be passed to the guest operating system. Before passing the system call to the guest operating system, the system call may be modified, or one or more actions may be performed. The system call may be executed and/or modified using one or more aspects.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "executing", "performing", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates a computing device 100, in accordance with one embodiment of the present invention. The computing device 100 includes bare platform hardware 110, a virtual machine monitor (VMM) 108 and a virtual machine 102. The platform hardware 110 can be of a personal computer (PC), server computer, mainframe, handheld device, portable computer, set-top box, or any other computing system. The platform hardware 110 can include a processor 120, memory, input/output (I/O) devices, storage devices, etc.

The processor 120 is configured to execute sequences of stored instructions that are included in software (e.g., in VMM 108, VM 102, guest OS 104, process 106, etc.). These instructions can be executed in different execution threads, which may have varying levels of privilege. The processor 120 includes multiple different privilege levels for protecting the processor's resources and other system resources. An execution thread operating at a highest privilege level (typically a privilege level 0) has access to all system resources, including all memory regions, all I/O ports, and any special instructions (e.g., instructions for handling system calls). An execution thread operating at a lower privilege level (e.g., privilege level 1 or 3) does not have complete access to system resources.

The VMM (also known as a hypervisor or host) 108, though typically implemented in software, may emulate and export a bare machine interface to higher level software. Such higher level software may comprise a standard or real-time OS, may be a highly stripped down operating environment with limited operating system functionality, may not include traditional OS facilities, etc. Typically, the VMM 102 has the highest privilege level provided by the processor 120.

In one embodiment, the VMM 108 is run directly on bare platform hardware 110. In another embodiment, the VMM 108 is run on top of a host OS. Alternatively, for example, the VMM 108 may be run within, or on top of, another VMM. VMMs may be implemented, for example, in hardware, software, firmware or by a combination of various techniques.

The VMM 108 presents to other software (i.e., "guest" software) the abstraction of one or more virtual machines (VMs) 102, which may provide the same or different abstractions to the various guests (e.g., guest operating system 104). Though a single virtual machine 102 is shown, multiple virtual machines may operate on the virtual machine monitor 108, each of which may include a separate guest operating system 104. The virtual machine 102, and all software running on the virtual machine 102 (e.g., guest OS 104 and process 106) typically have a privilege level that is lower than that of the virtual machine monitor 108.

The guest OS 104 may include a kernel that is responsible for managing processes and virtualized resources provided by the VMM 108. However, since the guest OS 104 does not operate at the highest privilege level, it does not manage most actual system resources, such as the processor 120, I/O ports, storage devices, etc.

One or more processes 106 may run on guest operating system 104. The processes 106 may be routines, services, applications, programs, etc. It is not uncommon for a process 106 to require that a privileged instruction be performed (e.g., an I/O operation). However, the process 106 does not have access to execute privileged instructions. Therefore, the guest OS 104 provides services that execute the privileged instructions for the processes 106. Examples of services include those that execute privileged instructions that modify registers of descriptor tables, perform input/output operations, create a new process, etc.

When process 106 needs a privileged instruction to be performed, the process 106 needs to transfer control from a non-privileged or restricted mode of the process 106 (in which a thread operates at a non-privileged access level) to a privileged or unrestricted mode (in which a thread operates at a privileged access level). In one embodiment, the process passes control to the unrestricted mode by causing a software generated trap (also known as an interrupt or exception), which gets passed to a thread operating at the privileged access level. The software generated trap is a mechanism for passing control from the restricted mode to the unrestricted mode. The trap includes information that can be used to identify a particular service that the process 106 requires. Note that a software generated trap should not be confused with a hardware generated trap, which originates from the operation of a hardware device such as a hard disk drive, as opposed to the operation of software such as a process or operating system.

In one embodiment, the process 106 causes the software generated trap by attempting to perform an illegal instruction (e.g., by dividing by 0). In another embodiment, the process causes the software generated trap by attempting to perform the privileged instruction. Such an attempt to execute an illegal or privileged instruction may or may not trigger a system call. A system call is a request to the operating system for a particular service. Examples of privileged instructions that process 106 may attempt to perform that would not trigger a system call include, for example, input/output instructions. Privileged instructions that could cause a system call include instructions for performing process control, file management, device management, information maintenance, communications, etc.

In another embodiment, process 106 causes the software generated trap by attempting to make a system call to the kernel of the guest operating system 104 using a so called "fast" control transfer. Examples of such fast control transfers include the SYSCALL/SYSRET control transfer mechanism provided by processors manufactured by Advanced Micro Devices® (AMD®) and the SYSENTER/SYSEXIT control transfer mechanism provided in processors manufactured by Intel®. System calls made using a fast control transfer mechanism also include an identification of the service that process 106 requires.

In a non-virtualized system, the kernel of the operating system would operate at the privileged access level, and thus would receive the software generated trap and/or system call. The operating system would then perform the requested service (e.g., execute privileged instructions) identified by the system call or trap, and pass a result back to the process 106.

As previously mentioned, in a virtualized system the virtual machine monitor 108, and not the guest OS 104, has privileged access. Therefore, when process 108 causes a software generated trap (e.g., by making a system call), the software generated trap is passed to the virtual machine monitor 108. For example, when process 106 makes a system call using the SYSCALL control transfer mechanism or the SYSENTER control transfer mechanism, a software generated trap is caused, which causes the system call to be passed to the virtual machine monitor 108.

Upon receiving the software generated trap and/or system call, a conventional virtual machine monitor 108 would immediately pass the trap/system call directly to the guest operating system 104 so that the guest operating system 104 could respond to the trap/system call. Conventional virtual machine monitors 108 do not perform any additional actions in response to receiving the software generated trap or system call.

Embodiments of the present invention improve on conventional virtual machine monitors. In one embodiment, the virtual machine monitor 108 performs one or more services in response to receiving the software generated trap and/or system call. The performed service or services may be cross-cutting concerns implemented by aspects included in the virtual machine monitor 108. In one embodiment, the virtual machine monitor 108 includes a system call handler 114. The system call handler 114 monitors for software generated traps and system calls directed to guest operating system 104, and causes one or more services to be performed when a software generated trap or system call is received. The system call handler 114 can be a component of the VMM 108, a plugin of the VMM 108, or a separate module within the VMM layer with the same privilege level as the VMM 108.

In one embodiment, the VMM 108 invokes system call handler 114 upon receiving the software generated trap (or upon receiving the system call). Alternatively, system call handler 114 may already be running (e.g., on virtual machine monitor 108), and may automatically receive the trap or system call. The system call handler 114 can then perform a service requested by the trap or system call and/or one or more additional services that were not requested. In one embodiment, the service or services invoked by the system call handler 114 depends on the nature of the received trap. For example, a security service may be associated with a system call that requests a service for connecting to a port, and a compression service may be associated with a system call that requests a service for reading from or writing to a storage device. In one embodiment, performing the service includes invoking an aspect that comprises a separate unit of execution from the virtual machine (e.g., a separate thread, module, etc.).

In one embodiment, the system call handler 114 has access to an aspect library 112. The aspect library 112 may include one or more aspect modules (e.g., aspect module 124 and aspect module 126). Each aspect module 124, 126 may perform a specific service or services. For example, each aspect module 124, 126 can add functionality of a distinct crosscutting concern to the guest operating system 104 and/or process 106. Examples of aspect modules include services that provide authentication, logging, security, session management, web page reformatting, content filtering, database transactions, etc. For example, aspect module 124 may provide authentication functionality, and aspect module 126 may provide session management functionality. In one embodiment, aspect module 124 is configured to respond to a specific system call or trap (e.g., to perform a specific service identified in the system call). Alternatively, aspect module 124 may be configured to modify the system call or trap, or perform an action of a cross-cutting concern unrelated to the service requested by a system call when the system call is received.

After aspect modules associated with a received trap/system call perform their services, the aspect modules 124, 126 may pass the trap/system call to the guest operating system 104 or pass a result generated by the service to the process 106. If the guest operating system 104 receives the trap/system call, it may respond to the trap/system call by performing the requested service to generate a result, and pass the result to the process 106.

Aspect modules 124, 126 allow for programs that rely on specific crosscutting concerns (e.g., authentication, security, etc.) to be designed and written independently of an underlying authentication, security, or other crosscutting behavior. For example, guest operating system 104 may not have certain crosscutting capabilities, which may be provided by an aspect module 124, 126.

In one embodiment, upon receiving a software generated trap, system call handler 114 accesses aspect library 112, and determines whether there are any aspect modules 124, 126 in aspect library 112 that are associated with the software generated trap, which may include a system call. If there are any aspect modules 124, 126 that are associated with the received software generated trap, then those aspect modules 124, 126 may be invoked.

An aspect module 124, 126 may act as a before advice handler or as an after advice handler. In one embodiment, an aspect module 124, 126 acting as a before advice handler performs services (e.g., operations of a crosscutting concern) before passing the software generated trap to the guest operating system 104. In another embodiment, the aspect module 124, 126 performs the services to generate a result, and passes the result to the process 106 without sending the software generated trap to the guest operating system 104. FIGS. 2A, 2B, 3, and 4A illustrate embodiments in which an aspect module may act as a before advice handler.

An aspect module 124, 126 acting as an after advice handler makes the process 106 that caused the software generated trap to cause another software generated trap when control is passed back to the process 106 (e.g., when a thread in which the process 106 is executing becomes active). The aspect module 124, 126 may cause the process 106 to generate another trap upon receiving control by modifying the process 106 or a process environment of the process 106. Modifying the process environment may include modifying a page table entry or a segment descriptor for the process 106. For example, the page table entry may be modified to mark the process 106 as including an illegal instruction.

In one embodiment, in which a system call is received by the virtual machine monitor, the aspect module 124, 126 modifies the process so that it will pass the system call and/or a system call response (a result generated by a service requested by the system call) back to the virtual machine monitor 108 (or directly to the aspect module 124, 126 or system call handler 114) upon the process 106 receiving the response.

Figure 2A:
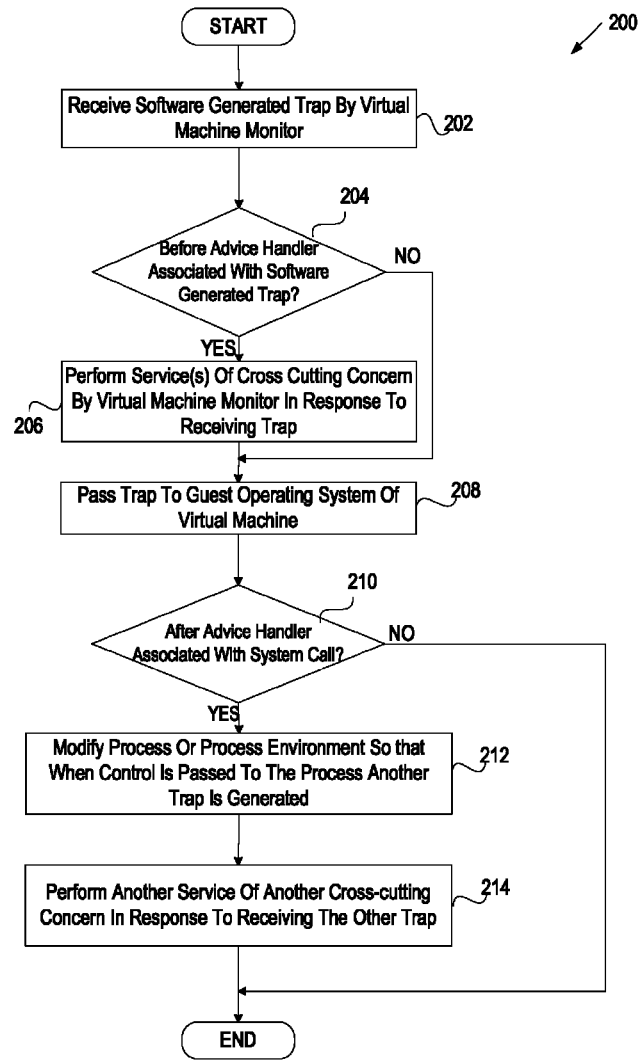
FIG. 2A is a flow diagram illustrating one embodiment of a method for implementing aspects in a virtual machine monitor.
Figure 7:
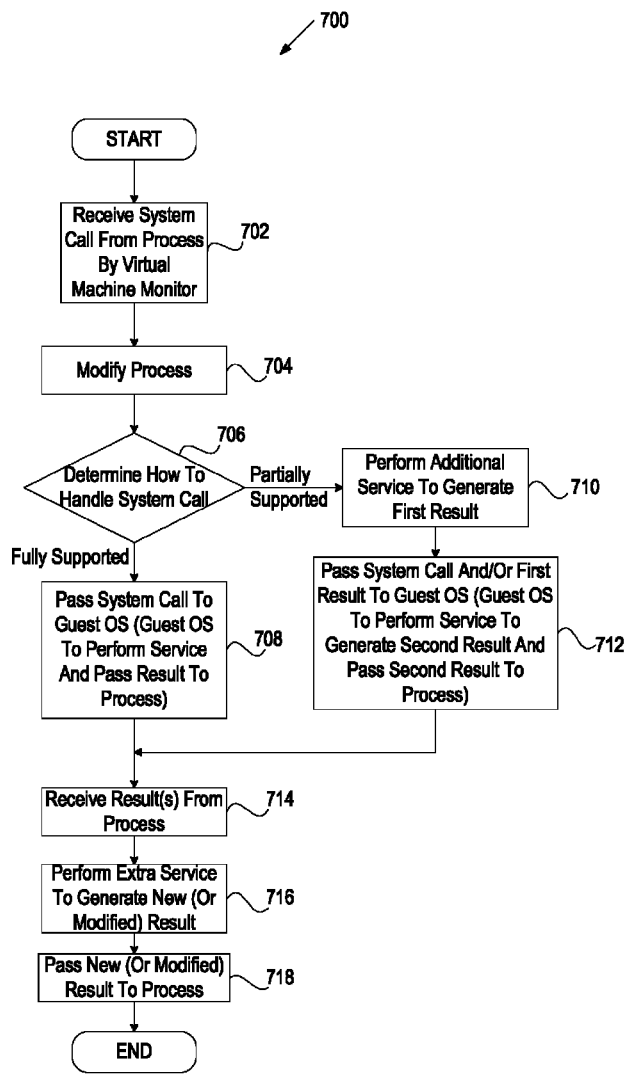
FIG. 7 is a flow diagram illustrating still yet another embodiment of a method for providing services by a virtual machine monitor.

The aspect module 124, 126 acting as the after advice handler may then perform services (e.g., operations of a crosscutting concern) upon receiving the response and/or the additional trap. FIGS. 2A and 7 illustrate embodiments in which an aspect module may act as an after advice handler.

In one embodiment, the result returned by an aspect module 124, 126 or system call handler 114 to the process 106 and/or to the guest operating system 104 is a callback. Callbacks are programming mechanisms used to, for example, pass a function as an argument to another function. Callbacks generally allow the passing of executable code to another piece of code. Typically, callbacks are implemented by passing references to code, rather than passing the code directly. Passing reference to the code can take the form of passing a direct pointer to the executable code (for example, C and C++ pass function pointers that are the virtual addresses of the code to be executed, which carries a risk of passing a bogus or corrupted address), an opaque reference token (for example, a code reference in Perl is a specially typed value that can only be created by explicitly asking for a reference to a given piece of code), or an object that implements a particular callback reference (which is how callbacks are handled in Java). Callbacks are often loaded separately from a particular software environment in which they will be called, and may be "external" to the code into which they are called. Implementation of a callback in a VM may allow modification of the operation of the VM 102, or of the guest operating system 104 or process 106 without having to change the code loaded in the VM 102, guest OS 104 or process 106.

An aspect can be loaded and registered as a callback, and thus be called within a VM 102 by another function (e.g., by guest OS 104 or process 106). In one embodiment, the callback causes the virtual machine 102 to evaluate or execute certain intermediate instructions, or certain operations of the program, which represent the functionality of the aspect. The intermediate instructions can be identified in the aspect callback by reference to functions, calls, methods, or address space. Thus, some amount of intermediate instructions can be evaluated by operation of the callback. It will be understood that the program operations would be operations that may not normally be called to perform a certain function. Thus, a certain function can be executed, for example, which points to a particular entry in a reference table, which references the callback. The callback can then cause other parts of the program to be executed by causing the virtual machine to evaluate certain intermediate instructions.

In one embodiment, virtual machine 102 and virtual machine monitor 108 are components of a self hosted virtualized guest operating system. A self hosted virtualized guest operating system is an operating system that loads a virtualization module that sits between the operating system and the hardware platform. The virtualization module effectively becomes a virtual machine monitor for the already running operating system. Once the virtualization module is loaded, the virtualization module can perform all of the operations discussed in the present application with reference to the VMM. Thus, an operating system can load the virtualization module in order to be able to provide services of system calls not normally supported by the operating system. The operating system may load the virtualization module when it is first loaded, upon receiving an unsupported system call, or at other times.

The above discussion has described how the virtual machine monitor 108 can respond to software generated traps that are caused by actions of process 106. It should be understood that the guest operating system 104 may also perform actions that cause software generated traps. Since the guest operating system 104 does not operate in the unrestricted mode, when the guest operating system 104 needs to perform some privileged instructions, it may cause traps, which are then passed to the virtual machine monitor 108. Thus the above description also applies to activities of the guest operating system 104.

FIG. 2A is a flow diagram illustrating one embodiment of a method 200 for implementing aspects in a virtual machine monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by VMM 108, system call handler 114 and/or one or more aspect modules 124, 126 of FIG. 1. Alternatively, method 200 may be performed by a system call handler 114 and/or one or more aspect modules 124, 126 that operate within the VMM layer with the same privilege level as the VMM 108. The following discussion describes a virtual machine monitor performing numerous operations. However, it should be understood that these operations may also be performed by the system call handler and/or the aspect modules.

Referring to FIG. 2A, at block 202 of method 200 a virtual machine monitor receives a software generated trap. The software generated trap may have been caused by a guest operating system hosted by a virtual machine. Alternatively, the software generated trap may have been caused by a process running on the guest operating system. In one embodiment, the software generated trap includes a system call.

At block 204, the virtual machine monitor determines whether any before advice handlers are associated with the software generated trap (e.g., with an included system call). A before advice handler in one embodiment is a service that is configured to address one or more cross cutting concerns before the software generated trap is passed to a guest operating system hosted by the virtual machine. Alternatively, a before advice handler may be a module that is configured to invoke one or more services of cross cutting concerns in response to receiving particular system calls. If a before advice handler is associated with the trap, the method proceeds to block 206. Otherwise, the method proceeds to block 208.

At block 206, the virtual machine monitor (or the before advice handler) performs one or more services of cross cutting concerns in response to receiving the trap. Performing the one or more services may include invoking an aspect, the aspect comprising a separate unit of execution from the virtual machine monitor.

At block 208, the virtual machine monitor passes the software generated trap to the guest operating system.

At block 210, the virtual machine monitor determines whether any after advice handlers are associated with the trap. An after advice handler in one embodiment is a service that is configured to address one or more cross cutting concerns after the software generated trap is passed to a guest operating system hosted by the virtual machine. Alternatively, an after advice handler may be a module that is configured to invoke one or more services of cross cutting concerns in response to an action of a guest operating system that indicates a return to a running process in the virtualized system. If an after advice handler is associated with the system call, the method proceeds to block 212. Otherwise, the method ends.

In one embodiment, at block 212, the virtual machine monitor modifies a page table entry (or segment descriptor) for the process so that when control is returned to the process, an additional software generated trap is caused. At block 214, the virtual machine monitor performs another service of another cross-cutting concern in response to receiving the additional software generated trap. In one embodiment, the additional software generated trap includes the system call and/or a result generated by the guest operating system in responding to the system call. The method then ends.

Figure 2B:
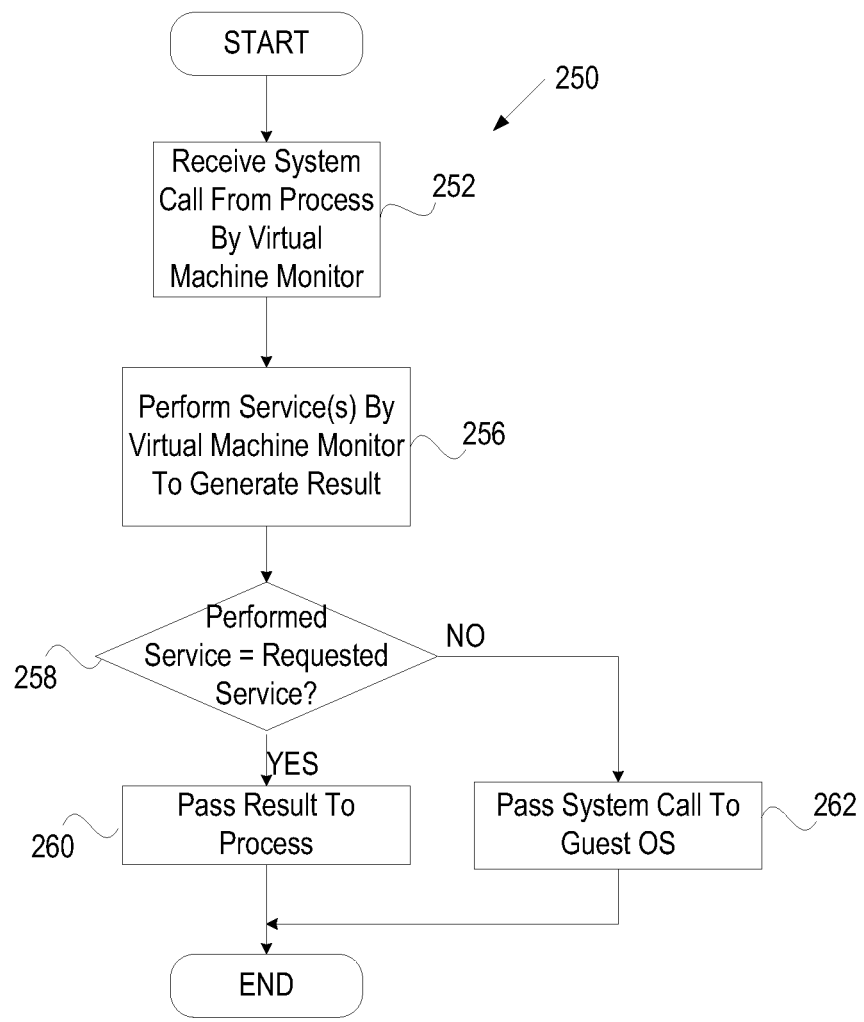
FIG. 2B is a flow diagram illustrating an embodiment of a method for providing services by a virtual machine monitor.

FIG. 2B is a flow diagram illustrating one embodiment of a method 250 for providing services by a virtual machine monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 250 is performed by VMM 108, system call handler 114 and/or one or more aspect modules 124, 126 of FIG. 1. Alternatively, method 250 may be performed by a system call handler 114 and/or one or more aspect modules 124, 126 that operate within the VMM layer with the same privilege level as the VMM 108. The following discussion describes a virtual machine monitor performing numerous operations. However, it should be understood that these operations may also be performed by the system call handler and/or the aspect modules.

Referring to FIG. 2, at block 252 of method 250 a virtual machine monitor receives a system call. The system call may have been generated by a process operating on a guest operating system that runs on top of the virtual machine monitor (e.g., within a virtual machine hosted by the virtual machine monitor). The system call includes a request for performance of a particular service.

At block 256, the virtual machine monitor performs one or more services that are associated with the system call. The services that are associated with the system call may or may not be the service that was requested by the system call. In one embodiment, the performed service or services are of a cross-cutting concern, and are included in an aspect. For example, the system call may be a request for a service to store data to a storage device, and the associated service may be a service of a cross-cutting concern for encrypting the data. Upon completion of the services, one or more results are generated.

At block 258, the virtual machine monitor determines whether the performed service or services included the service that was requested. If the requested service was not performed, the method proceeds to block 262. If the requested service was performed, the method proceeds to block 250.

At block 260, the virtual machine monitor passes the generated results to the process that generated the system call. Alternatively, or in addition, the virtual machine monitor may pass a pointer to the process that indicates where the results can be found.

At block 262, the virtual machine monitor passes the system call to the guest operating system. The virtual machine monitor may also pass the generated result or results to the guest OS and/or to the process. The guest OS may then perform the requested service for the process. If results were passed to the guest OS, these results may be used by the guest OS when it performs the requested service. For example, if the requested service was a write operation for a block of data, and the VMM encrypted the block of data, then the guest OS may perform the write operation using the encrypted block of data rather than the clear text data originally provided by the process.

The method then ends.

Figure 3:
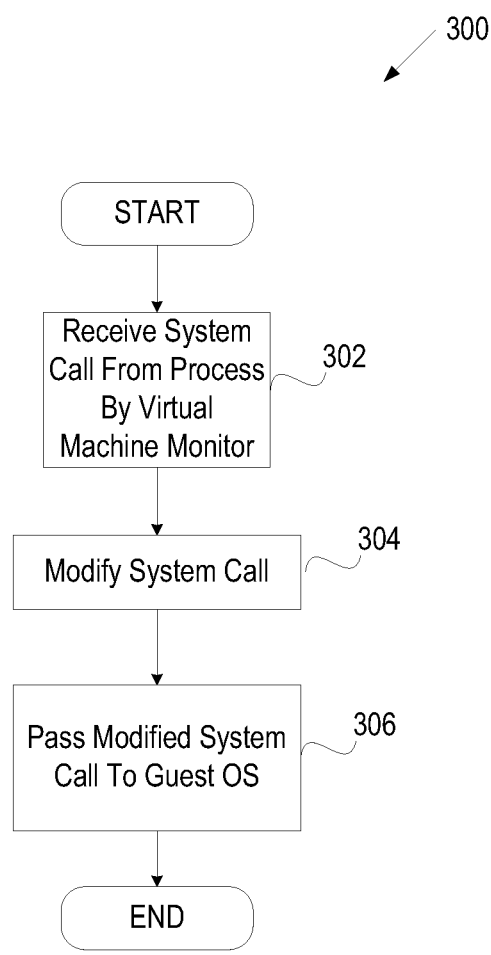
FIG. 3 is a flow diagram illustrating another embodiment of a method for providing services by a virtual machine monitor.

FIG. 3 is a flow diagram illustrating another embodiment of a method 300 for providing services by a virtual machine monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 300 is performed by VMM 108, system call handler 114 and/or one or more aspect modules 124, 126 of FIG. 1. Alternatively, method 300 may be performed by a system call handler 114 and/or one or more aspect modules 124, 126 that operate within the VMM layer with the same privilege level as the VMM 108. The following discussion describes a virtual machine monitor performing numerous operations. However, it should be understood that these operations may also be performed by the system call handler and/or the aspect modules.

Referring to FIG. 3, at block 302 of method 300 a virtual machine monitor receives a system call from a process. The system call includes a request for performance of a particular service.

At block 304, the virtual machine monitor modifies the system call. The system call may be modified by changing one or more parameters provided by the process when it generated the system call. Alternatively, the system call may be modified by changing the requested service to a new service that was not requested. In one embodiment, the system call is replaced by a new system call for the new service.

At block 306, the virtual machine monitor passes the modified system call to a guest operating system that operates on a virtual machine hosted by the virtual machine monitor. The guest OS may then perform the requested service or the new service for the process. If the parameters associated with the system call were changed, then the guest OS performs the requested service using the new parameters. If the system call was changed to a new system call, then the guest OS performs the new service identified by the new system call.

The method then ends.

Figure 4A:
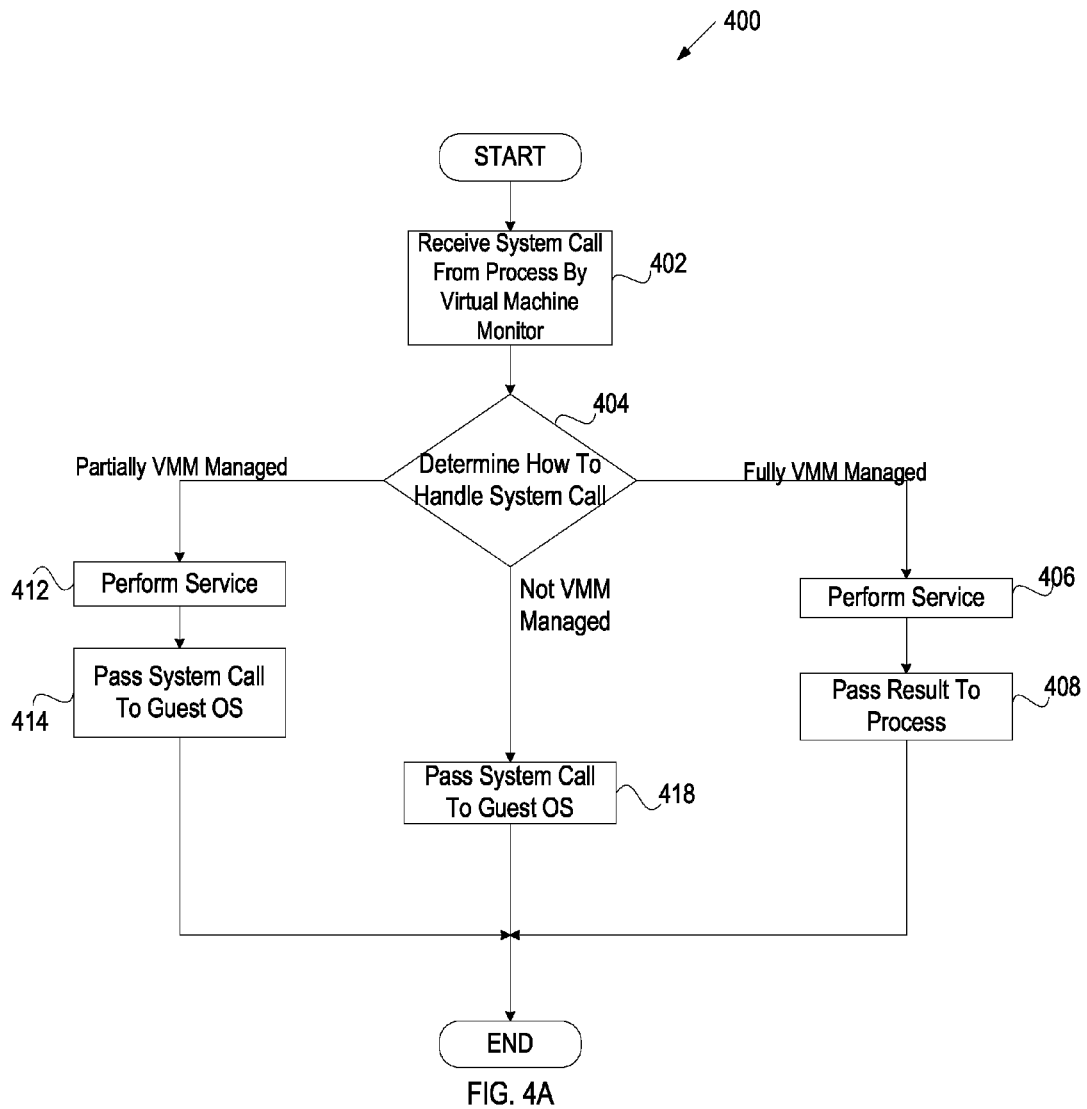
FIG. 4A is a flow diagram illustrating yet another embodiment of a method for providing services by a virtual machine monitor.

FIG. 4A is a flow diagram illustrating yet another embodiment of a method 400 for providing services by a virtual machine monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 400 is performed by VMM 108, system call handler 114 and/or one or more aspect modules 124, 126 of FIG. 1. Alternatively, method 400 may be performed by a system call handler 114 and/or one or more aspect modules 124, 126 that operate within the VMM layer with the same privilege level as the VMM 108. The following discussion describes a virtual machine monitor performing numerous operations. However, it should be understood that these operations may also be performed by the system call handler and/or the aspect modules.

Referring to FIG. 4A, at block 402 of method 400 a virtual machine monitor receives a system call. The system call may have been generated by a process operating on a guest operating system that runs on top of the virtual machine monitor (e.g., within a virtual machine hosted by the virtual machine monitor). The system call includes a request for performance of a particular service.

At block 404, the virtual machine monitor determines how to handle the system call. In one embodiment, the VMM determines whether the requested system call is fully managed by the VMM, partially managed by the VMM, or not managed by the VMM. In one embodiment, whether the system call is fully managed, partially managed, or not managed by the VMM is based on whether the system call is supported by the guest operating system. Each operating system (e.g., Windows, Linux, OS X, etc.) includes its own collections of system calls. Even different versions of operating systems typically include at least some differing system calls. For example, Windows Vista includes system calls that are not supported by Windows XP or Windows 98.

Typically there is an identifier (e.g., a number) associated with each system call. In one embodiment, a system call table is maintained that is indexed according to these identifiers.

FIG. 4B illustrates a partial table of Windows system calls that shows whether system calls are available for different versions of Windows NT, Windows XP and Windows Vista. The list identifies the system call name in the leftmost column, and IDs that are used by the operating systems to recognize particular system calls in the other columns. For example, the value 0x0000 represents the NtAcceptConnectPort system call in all illustrated versions of Windows. Empty cells represent system calls that are not supported by a particular operating system version. For example, Windows NT, service pack 3 does not support the system call NtAccessCheckByType.

As shown, Windows Vista includes multiple system calls that are not available for Windows NT and Windows XP. Often, the reason that software will work on one version of an operating system and not on other versions of the operating system is because the software utilizes system calls that are not supported by those other versions of the operating system. For example, software that makes use of the NtAccessCheckByType system call may run on Windows XP and Windows Vista, but not on Windows NT.

Accordingly, returning to FIG. 4A, at block 404 the virtual machine monitor determines whether and/or how the VMM is configured to manage the system call. A system call may be fully managed by the VMM, not managed by the VMM, or partially managed by the VMM. A system call may be fully managed by the VMM, for example, if it is unsupported by the guest OS, if the system call is set to automatic fail for testing/debugging purposes, if more extensive permissions checks than are provided in the guest operating system are required, etc. A system call may not be managed by the VMM, for example, if the guest OS fully supports the system call.

The system call may be partially managed by the VMM if the system call is partially supported by the guest OS. A system call that is partially supported may be a system call that is present but unused by the operating system. Alternatively, the system call may be a different version of the system call that is supported by the guest OS. For example, if the guest OS supports the system call, but accepts different parameters for the system call than the process provides. Alternatively, the guest OS may support the system call, but may identify the system call by a different identifier than the one provided by the process.

A system call may be fully or partially managed by the VMM if the guest OS fully supports the system call, but will return an unacceptable result upon responding to the system call. For example, many programs that require windows XP will request the version of the running Windows, and abort with an error message if the reported version is too low. A "get version" system call has existed essentially unchanged between different versions of the Windows OS, but may return inappropriate results (e.g., a result indicating that the guest OS is not Windows XP) that will cause an otherwise working application to fail, even though the system call is fully supported.

If the system call is fully managed by the VMM, the method proceeds to block 406. If the system call is not managed by the VMM, the method proceeds to block 410. If the system call is partially managed by the VMM, the method proceeds to block 412.

At block 406, the VMM performs the requested service to generate a result. The method then proceeds to block 408, and the result is passed to the process. The result may be passed directly to the process, bypassing the guest OS. Thus, the VMM may provide services for system calls that are not supported by the guest OS. This enables software to run on the guest OS that uses system calls not provided by the guest OS. For example, software that is written for Windows Vista may be run on older versions of windows, such as Windows XP or Windows NT.

At block 412, the VMM performs a service that is associated with the system call. The performed service causes the system call to take on a form that can be successfully operated on by a service provided by the guest OS. This may include performing a portion of the requested service (e.g., to generate a partial result), changing parameters associated with the system call, changing an ID associated with the system call, etc. At block 414, the modified system call is passed to the guest OS. The method then ends.

At block 418, the VMM passes the system call to the guest OS. The method then ends.

Figure 5A:
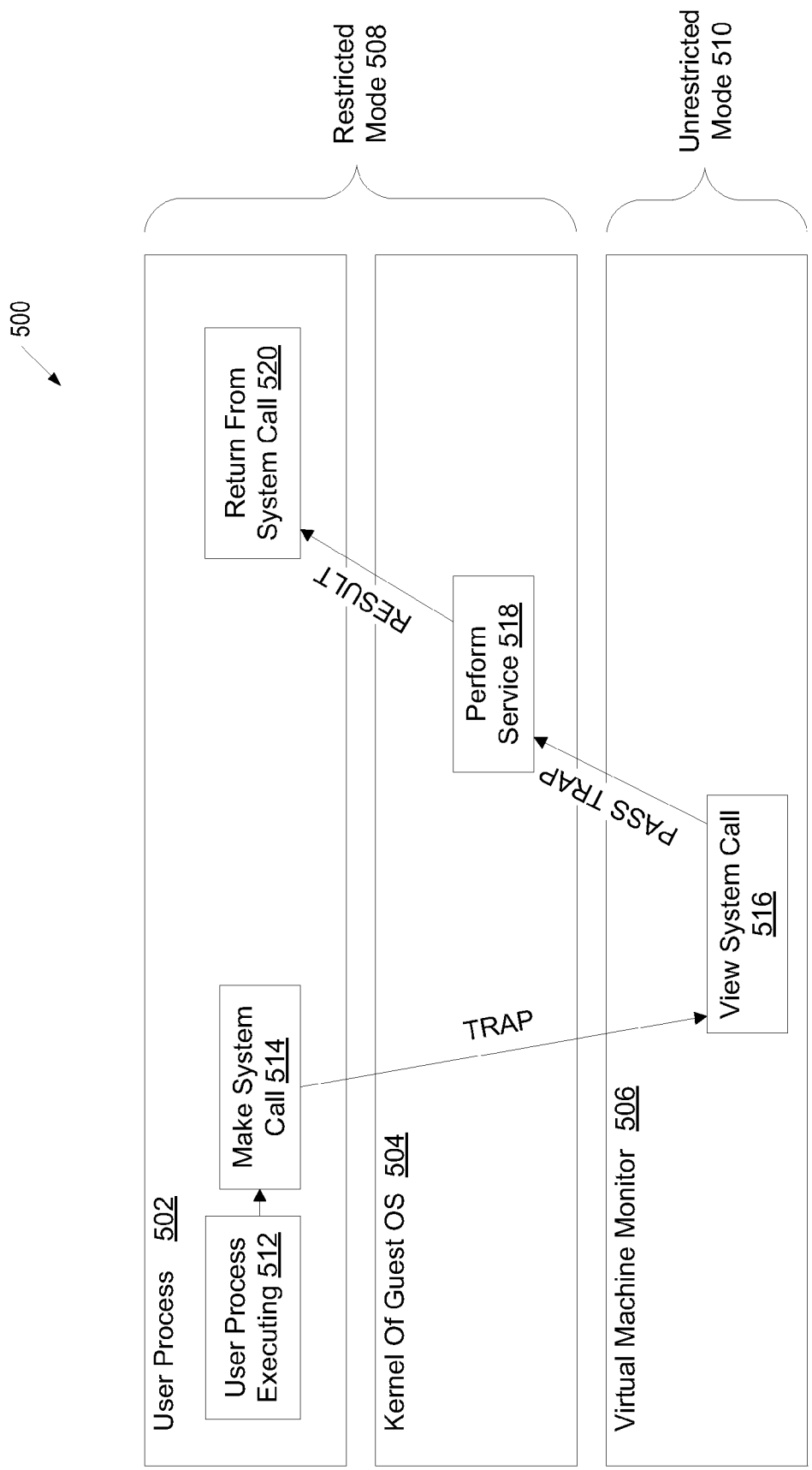
FIG. 5A illustrates a sequence diagram of a system call, in accordance with one embodiment of the present invention.

FIG. 5A illustrates a sequence diagram 500 of a system call, in accordance with one embodiment of the present invention. A virtual machine monitor 506 virtualizes an underlying hardware platform, and operates at a highest privilege level. A guest OS 504 runs on a virtual machine hosted by the VMM 506. A user process 502 runs on the guest OS 504. Both the user process 502 and the guest OS 504 operate at privilege levels that are lower than the highest privilege level. In one embodiment, the user process 502 and the guest OS 504 operate at the same privilege level. Alternatively, the guest OS 504 may operate at a higher privilege level than the user process 502.

In one embodiment, the user process 502 and the kernel of the guest OS 504 both operate in a restricted mode 508, and the VMM 506 operates in an unrestricted mode 510. Software that operates in the unrestricted mode can request any operation made available by the underlying platform. Therefore, software that operates in the unrestricted mode 510 can execute any instruction, perform any I/O operation, access any memory, etc. Software that operates in the restricted mode 508 is only permitted a subset of the available operations.

As shown in the sequence diagram 500, the sequence begins at block 512 with execution of the user process in the restricted mode 508. At block 514, the user process makes a system call for a service (e.g., a request for execution of an instruction or set of instructions that the user process 502 does not have permission to execute). The system call causes a trap, which is passed to the virtual machine monitor 506. Control is passed to the VMM 506, which operates in the unrestricted mode 510. The virtual machine monitor 506 views the system call at block 516. In one embodiment, the VMM 506 determines that the system call is not managed by the VMM 506 (e.g., if the system call is fully supported by the guest OS 504), and passes the trap to a kernel of the guest OS 504. In another embodiment, the VMM 506 determines that the system call is partially managed by the VMM 506 (e.g., if the system call is partially supported by the guest OS 504, or the guest OS 504 supports a similar system call that can provide an equivalent service). Upon making such a determination, the VMM 506 alters the system call so that it can be processed by a service of the guest OS 504. For example, the VMM 506 may change the parameters for the system call and/or may perform one or more instructions for the system call. In one embodiment, the VMM 506 changes the system call to a new system call.

Control is passed to the kernel of the Guest OS 504, which operates in the restricted mode 508. At block 518, the kernel of the guest OS 504 in one embodiment performs the service requested by the system call. In another embodiment, the kernel of the guest OS 504 performs a service of the altered system call. The guest OS 504 then returns a result to the user process. At block 520, the process receives the returned result, and continues executing.

Figure 5B:
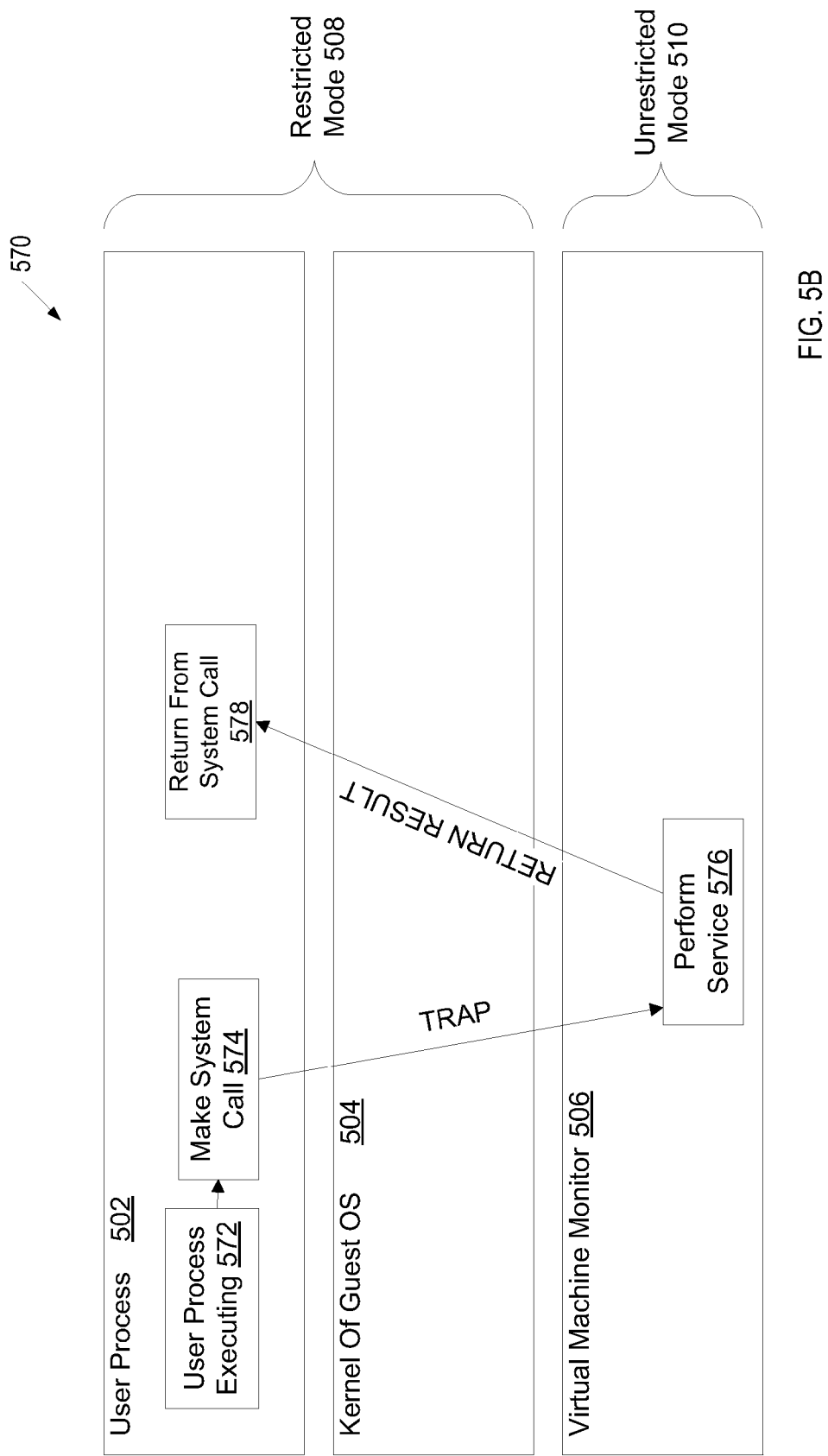
FIG. 5B illustrates a sequence diagram of a system call, in accordance with another embodiment of the present invention.

FIG. 5B illustrates a sequence diagram 570 of a system call, in accordance with another embodiment of the present invention. A virtual machine monitor 506 virtualizes an underlying hardware platform, and operates at a highest privilege level. A guest OS 504 runs on a virtual machine hosted by the VMM 506. A user process 502 runs on the guest OS 504. Both the user process 502 and the guest OS 504 operate at privilege levels that are lower than the highest privilege level. In one embodiment, the user process 502 and the guest OS 504 both operate in a restricted mode 508, and the VMM 506 operates in an unrestricted mode 510.

As shown in the sequence diagram 570, the sequence begins at block 572 with execution of the user process in the restricted mode 508. At block 574, the user process makes a system call for a service (e.g., an instruction or set of instructions that the user process 502 does not have permission to execute). The system call causes a trap, which is passed to the virtual machine monitor 506. Control is passed to the VMM 506, which operates in the unrestricted mode 510. The virtual machine monitor 506 views the system call at block 576. The VMM 506 determines that the system call is not supported by the guest OS 504. Accordingly, the VMM 506 performs the service requested by the system call at block 576 to generate a result. The VMM 506 then returns the result to the user process 502. At block 578, the process receives the returned result, and continues executing.

Figure 5C:
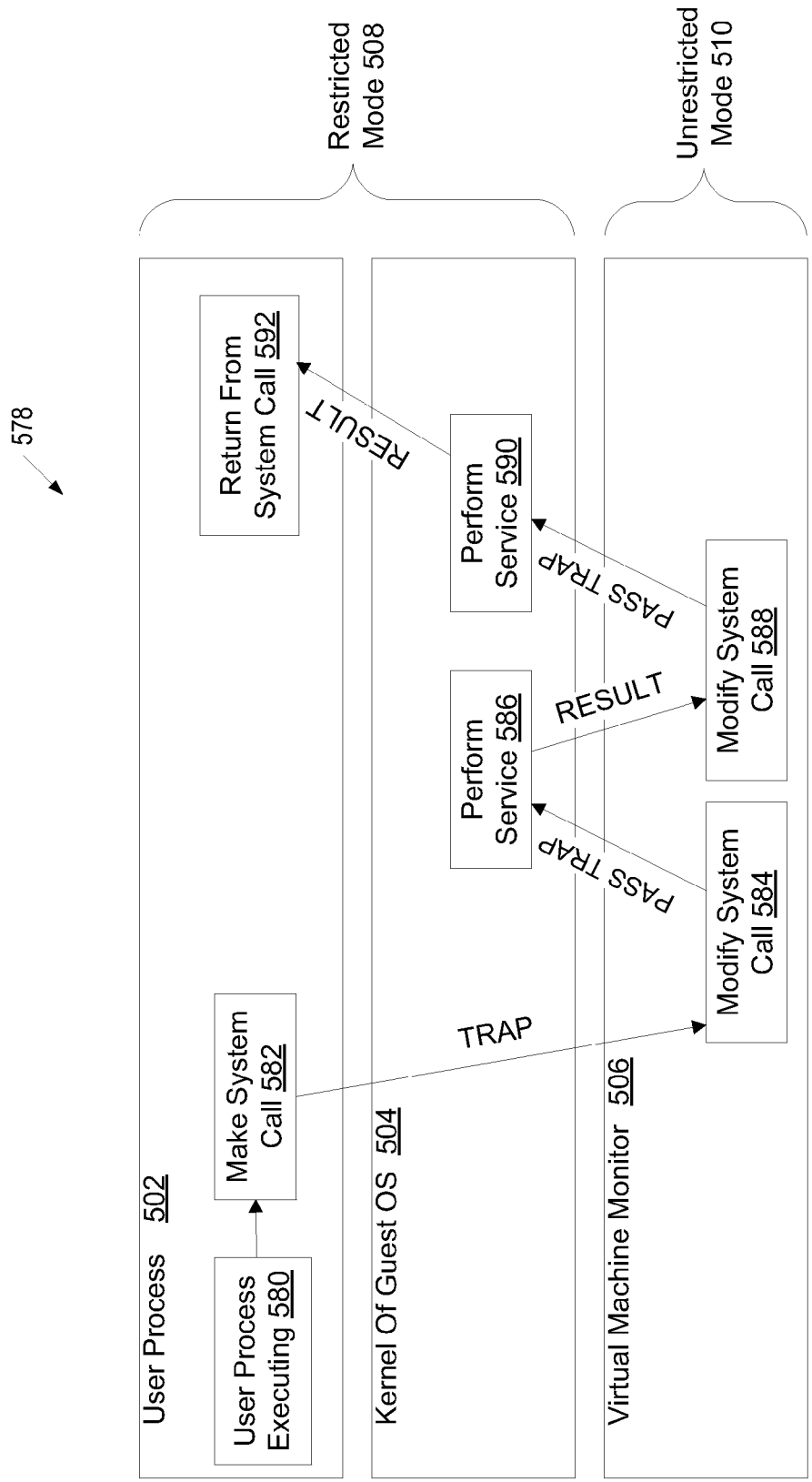
FIG. 5C illustrates a sequence diagram of a system call, in accordance with yet another embodiment of the present invention.

FIG. 5C illustrates a sequence diagram 578 of a system call, in accordance with yet another embodiment of the present invention. A virtual machine monitor 506 virtualizes an underlying hardware platform, and operates at a highest privilege level. A guest OS 504 runs on a virtual machine hosted by the VMM 506. A user process 502 runs on the guest OS 504. Both the user process 502 and the guest OS 504 operate at privilege levels that are lower than the highest privilege level. In one embodiment, the user process 502 and the guest OS 504 operate at the same privilege level. Alternatively, the guest OS 504 may operate at a higher privilege level than the user process 502. In one embodiment, the user process 502 and the kernel of the guest OS 504 both operate in a restricted mode 508, and the VMM 506 operates in an unrestricted mode 510.

As shown in the sequence diagram 578, the sequence begins at block 580 with execution of the user process in the restricted mode 508. At block 582, the user process makes a system call for a service (e.g., a request for execution of an instruction or set of instructions that the user process 502 does not have permission to execute). The system call causes a trap, which is passed to the virtual machine monitor 506. Control is passed to the VMM 506, which operates in the unrestricted mode 510. The virtual machine monitor 506 modifies the system call at block 584. In one embodiment, the VMM 506 changes the system call to a new system call. The VMM 506 then passes the trap along with the modified system call to the guest OS 504.

The guest OS 504 performs a service requested by the modified system call at block 586, and passes a result back to the VMM 506. The VMM 506 uses the result generated by the guest OS 504 to further modify the system call or generate a new system call at block 588. The new (or further modified) system call is passed back to the guest OS 504. At block 590, the guest OS performs another service associated with the modified system call. The guest OS 504 generates a new result, and passes the new result to the user process 502. At block 592, the process receives the returned result, and continues executing.

When a system call is made by a process, often more information is required than simply the identity of the desired system call. For example, one or more parameters may need to be passed to the thread that will be performing the service requested by the system call. Parameters to use in implementing a system call are typically written to a register when the system call is made. Parameters may also be stored in a block or table in memory, and an address of the block may be passed as a parameter in a register. Parameters may also be pushed onto the stack by the process and removed from the stack by the operating system or VMM that performs the service requested by the system call.

When a privileged thread (a thread running in an unrestricted mode) receives the system call, it may also receive a pointer to a parameter (e.g., a parameter value in a register) that includes additional instructions for use when executing the service requested by the system call. Alternatively, the system may have a prearranged register or registers (or other location) in which parameters for system calls are stored.

Figure 6A:
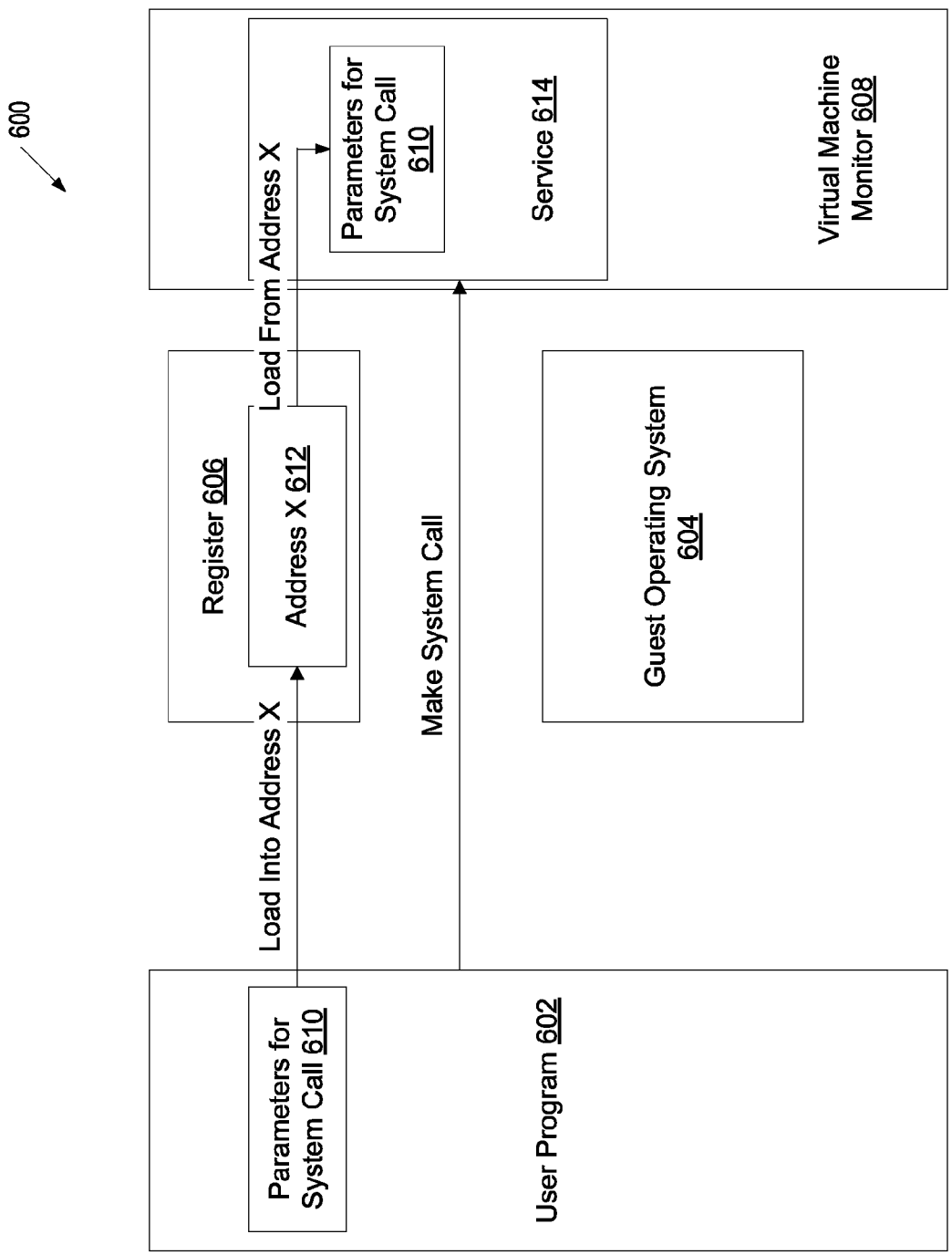
FIG. 6A illustrates one embodiment of passing parameters for a system call using a register.

FIG. 6A illustrates one embodiment of passing parameters for a system call 600, in which parameters are passed to a VMM 608 via a register 606. In FIG. 6A, a user program 602 loads parameters for a system call 610 into address X 612, which is a location in register 606. The user program then makes a system call, which is passed directly to VMM 608. Upon receiving the system call, the VMM 608 executes a service 614 requested by the system call. The service 614 retrieves the parameters from address X 612, and uses them to execute instructions requested by the system call.

Figure 6B:
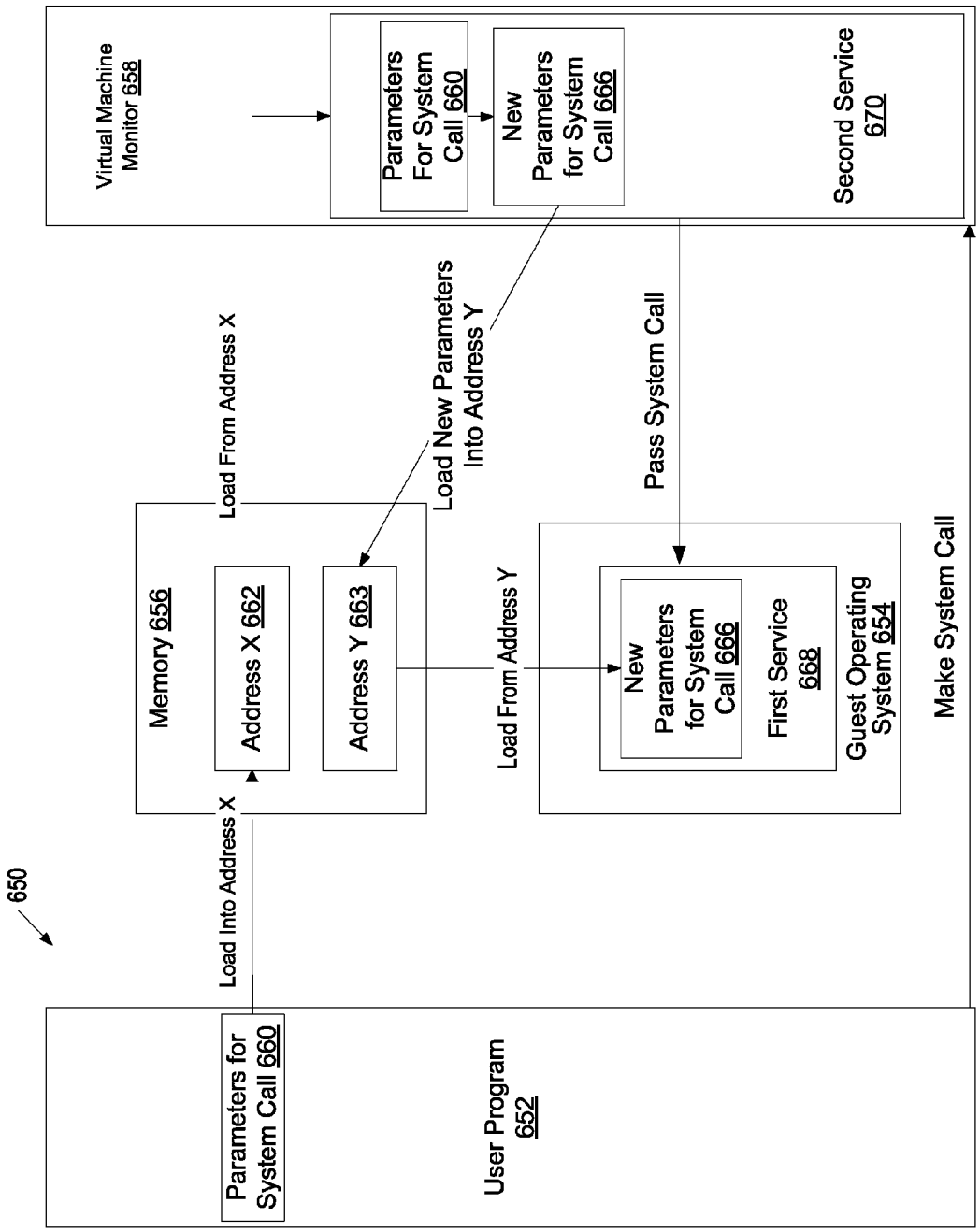
FIG. 6B illustrates another embodiment of passing parameters for a system call using a register.

FIG. 6B illustrates another embodiment of passing parameters for a system call 650, in which parameters are passed to a VMM 658 via a memory 656. In such an embodiment, some parameters may also be passed to the VMM via a register (not illustrated). In FIG. 6B, a user program 652 loads parameters for a system call 660 into address X 662, which is a location in memory 656. The user program then makes a system call, which is passed directly to VMM 658. Upon receiving the system call, the VMM 658 executes a second service 670 which was not requested by the system call, but which is associated with the system call by the VMM 658.

The second service 614 retrieves the parameters 660 from address X 662, and uses them to execute one or more instructions. Based on executing the instructions with the parameters, the second service 670 generates new parameters for the system call 666, and loads these new parameters into address Y 663 in memory 656. The VMM 658 then passes the system call to a guest operating system 654. A first service 668 that was originally requested by the service call is then initiated. The first service 668 retrieves the new parameters for the system call 666 from address Y 663, and uses them to execute instructions requested by the service call. The first service may then update the parameters in address X 662, which is in the memory space of the user program 652.

In one embodiment, parameters for a system call are passed between the user program 652, guest OS 654 and VMM 658 using a dummy process. In one embodiment, address Y 663 is in the memory space of the dummy process. In such an embodiment, upon the user program 652 issuing the system call, the dummy process is created, and parameters for the system call may be passed into the memory space of the dummy process. In one embodiment, a memory space of the dummy process (e.g., address Y 663) is thereafter unreadable and unwritable to the user program 652 and to all other processes that are not operating at a privileged level. The system call may be modified so that it appears as though the system call originated from the dummy process. The parameters stored in the address space of the dummy process may then be modified as necessary without a possibility of overwriting parameters that the user program 652 will later need, and without a possibility of causing a buffer overflow.

Once a result to the system call is generated by the guest OS and/or VMM, the result may be modified so that it is directed to the user program 652 rather than to the dummy process (e.g., may be loaded into address X 662). Thus, it appears to the original user program 652 that the system call went through directly to the guest OS. In one embodiment, in which the VMM can see the state of the guest OS, the VMM manipulates internal guest OS structures on the way in (when the trap is first passed to the VMM and/or guest OS) and then again on the way back out (when the result is returned to the user program 652) so that the guest OS would see the dummy process as the original one.

FIG. 7 is a flow diagram illustrating still yet another embodiment of a method 700 for providing services by a virtual machine monitor. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 700 is performed by VMM 108, system call handler 114 and/or one or more aspect modules 124, 126 of FIG. 1. Alternatively, method 700 may be performed by a system call handler 114 and/or one or more aspect modules 124, 126 that operate within the VMM layer with the same privilege level as the VMM 108. The following discussion describes a virtual machine monitor performing numerous operations. However, it should be understood that these operations may also be performed by the system call handler and/or the aspect modules.

Referring to FIG. 7, at block 702 of method 700 a virtual machine monitor receives a system call. The system call may have been generated by a process operating on a guest operating system that runs on top of the virtual machine monitor (e.g., within a virtual machine hosted by the virtual machine monitor). The system call includes a request for performance of a particular service.

At block 704, the virtual machine monitor modifies the process that the system call was received from. Alternatively, if a dummy process and/or secure system call wrapper are used, the VMM may modify the dummy process. There is typically no privileged transition or trap when results are passed back to the process. However, in some embodiments the VMM needs to operate on results that have been generated by the guest operating system before those results are received by the process. Accordingly, in one embodiment, the process (or dummy process) is modified such that when the process (or dummy process) receives a response to the system call, it generates another trap. The trap includes the results that were passed to the process in the response, and so the VMM can operate on (e.g., modify) the results.

In one embodiment, the VMM modifies the process (or dummy process) by adding a single page of memory to the process (or dummy process) at a point where the trap occurred. Therefore, when the kernel of the guest operating system returns the result to the process (or dummy process), it generates another trap. The copied page of memory in one embodiment is an identical copy to the original page of memory from the point of view of the process. In one embodiment, only one byte is changed so that the next instruction would cause another trap, which VMM would catch to get results that the guest operating system was going to pass back to the process.

In another embodiment, the VMM marks the page of memory where control is going to be returned in the process (or dummy process) as not executable. Therefore, when control returns to the process (or dummy process), another trap is generated, which gets passed to the VMM. Alternatively, the return address of the process may be modified before the system call gets passed from the VMM to the guest OS.

At block 706, the virtual machine monitor determines how to handle the system call. In one embodiment, the VMM determines whether the system call is fully managed, partially managed, or not managed by the VMM. In another embodiment, the VMM determines whether the system call is supported by the guest operating system. Each operating system (e.g., Windows, Linux, OS X, etc.) includes its own collections of system calls. Even different versions of operating systems typically include at least some differing system calls. For example, Windows Vista includes system calls that are not supported by Windows XP or Windows 98.

Additionally, some system calls may be nominally the same, but may support or make use of different parameters between different operating systems. A system call may only be partially supported by the guest OS if the guest OS supports the system call, but ignores one or more parameters that the process has passed. For example, in windows 95/98, some system calls include a security descriptor that could be used to manage security policies. However, since windows 95/98 did not implement security policies, windows 95/98 ignores security descriptors. Windows XP and Windows Vista, on the other hand, both make active use of security descriptors. The security descriptor lets the process do things such as change the active user, get access to files that it would not normally have access to, or restrict access to other processes. Therefore, a process that was written for Windows XP or windows Vista may include a security descriptor in a system call. The process that depends on that security descriptor will typically fail on a windows 95/98 system.

If the system call is supported by the guest OS, the method continues to block 708. If the system call is only partially supported by the guest OS, the method continues to block 710.

At block 708, the system call is passed to the guest OS. The guest OS would then perform the service and pass a result to the process.

At block 710, the VMM performs an additional service to generate a first result. The additional service modifies the system call to place it into a form that is operable on by the guest operating system. For example, if the system call included a security descriptor that is not used or understood by the guest OS, the VMM would do what it needs to do with the security descriptor in order to emulate the functionality that the process requested. For example, the VMM may change a user ID associated with the process, grant or restrict access based on the security descriptor, etc.

At block 712, the VMM passes the system call and/or the first result to the guest OS. Continuing the above example, once the VMM handles the portion of the system call that was associated with the security descriptor, it would pass the system call on to the guest OS in the appropriate security context, so that the guest OS could perform any remaining operations requested by the system call. The kernel of the guest OS would perform the remaining operations without respect to the ignored security descriptor, and pass results back to the process.

Upon receiving the result, the process would generate another trap (because of the modification previously made to the process), and pass the result to the VMM. At block 714, the VMM would check the results to determine whether any additional services should be performed. At block 716, the VMM performs an extra service to generate a new (or modified) result. The extra service may be after advice of a cross cutting concern. Continuing the above example, the VMM would change the results so that they match the security context that the process expects. At block 718, the VMM passes the new (or modified) result to the process. The method then ends.

Figure 8:
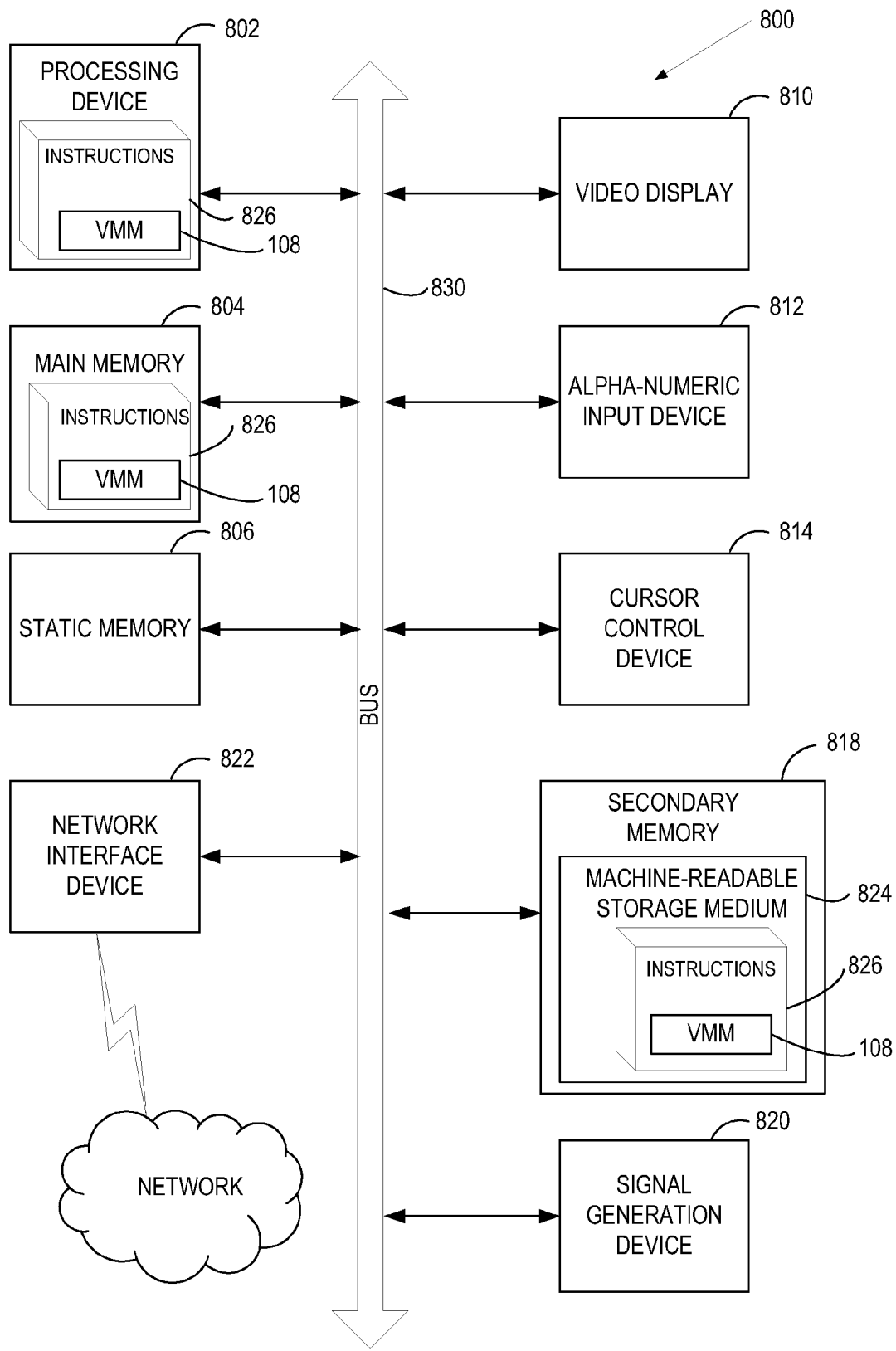
FIG. 8 illustrates a diagrammatic representation of a machine in the exemplary form of a computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 818 may include a machine-readable storage medium (or more specifically a computer-readable storage medium) 824 on which is stored one or more sets of instructions 826 (e.g., software) embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

The machine-readable storage medium 824 may also be used to store the VMM 108 of FIG. 1A, and/or a software library containing methods that call the VMM 108. While the machine-readable storage medium 824 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a software generated trap by a virtual machine monitor running on a computer system, wherein the software generated trap was caused by a system call issued by a process of a virtual machine hosted by the computer system; and
   performing a service by the virtual machine monitor in response to receiving the software generated trap.

2. The method of claim 1, wherein performing the service comprises invoking an aspect, the aspect comprising a separate unit of execution from the virtual machine monitor.

3. The method of claim 1, wherein the performed service is associated with the system call, and wherein performing the service generates a result, the method further comprising:
   returning the result to at least one of the process or a guest operating system of the virtual machine.

4. The method of claim 3, further comprising:
   determining whether the system call is managed by the virtual machine monitor; and
   if the system call is fully managed by the virtual machine monitor, performing the service associated with the system call to generate the result and returning the result to the process.

5. The method of claim 3, further comprising:
   determining whether the system call is partially managed by the virtual machine monitor; and
   if the system call is partially managed by the virtual machine monitor, performing the service to generate a partial result and passing the partial result and the system call to the guest operating system.

6. The method of claim 1, further comprising:
   passing the system call to a guest operating system of the virtual machine, the guest operating system to perform a service requested by the system call and to pass a result to the process;
   modifying the process or a process environment of the process so that when the process receives the result, the process passes at least one of the system call and the result back to the virtual machine monitor; and
   performing an other service in response to receiving the system call or the result.

7. The method of claim 6, wherein performing the other service comprises modifying the received result, the method further comprising:
   passing the modified result to the process.

8. The method of claim 1, wherein the system call attempts to execute a privileged or illegal instruction.

9. The method of claim 1, further comprising:
   modifying the process or a process environment of the process so that a next action of the process will cause another software generated trap.

10. A non-transitory computer readable storage medium comprising instructions that, when executed by a processing system, cause the processing system to perform a method, comprising:
    receiving a software generated trap by a virtual machine monitor running on a computer system, wherein the software generated trap was caused by a process or a guest operating system of a virtual machine hosted by the computer system; and
    performing a service by the virtual machine monitor in response to receiving the software generated trap, wherein performing the service comprises invoking an aspect, and wherein the aspect comprises a separate unit of execution from the virtual machine monitor.

11. The non-transitory computer readable storage medium of claim 10, wherein the software generated trap was caused by a system call issued by the process.

12. The non-transitory computer readable storage medium of claim 11, wherein the performed service is associated with the system call, and wherein performing the service generates a result, the method further comprising:
    returning the result to at least one of the process or the guest operating system.

13. The non-transitory computer readable storage medium of claim 12, the method further comprising:
    determining whether the system call is managed by the virtual machine monitor; and
    if the system call is fully managed by the virtual machine monitor, performing the service associated with the system call to generate the result and returning the result to the process.

14. The non-transitory computer readable storage medium of claim 12, the method further comprising:
   determining whether the system call is partially managed by the virtual machine monitor; and
   if the system call is partially managed by the virtual machine monitor, performing the service to generate a partial result and passing the partial result and the system call to the guest operating system.

15. The non-transitory computer readable storage medium of claim 11, the method further comprising:
   passing the system call to the guest operating system, the guest operating system to perform a service requested by the system call and to pass a result to the process;
   modifying the process or a process environment of the process so that when the process receives the result, the process passes at least one of the system call and the result back to the virtual machine monitor; and
   performing an other service in response to receiving the system call or the result.

16. The non-transitory computer readable storage medium of claim 15, wherein performing the other service comprises modifying the received result, the method further comprising:
   passing the modified result to the process.

17. The non-transitory computer readable storage medium of claim 10, wherein the software generated trap is caused by an attempt by the process or the guest operating system to execute a privileged or illegal instruction.

18. The non-transitory computer readable storage medium of claim 10, the method further comprising:
   modifying the process or a process environment of the process so that a next action of the process will cause another software generated trap.

19. A computing apparatus, comprising:
   a memory to store a virtual machine; and
   a processor to:
      receive a software generated trap caused by a system call issued by a process of the virtual machine; and
      perform a service in response to receiving the software generated trap.

20. The computing apparatus of claim 19, wherein the processor is also to execute a virtual machine monitor, and wherein performing the service comprises invoking an aspect, the aspect comprising a separate unit of execution from the virtual machine monitor.

21. The computing apparatus of claim 19, wherein the performed service is associated with the system call, and wherein performing the service generates a result, and wherein the result is returned to at least one of the process or a guest operating system of the virtual machine.

22. The computing apparatus of claim 21, wherein the processor is also to:
   execute a virtual machine monitor;
   determine whether the system call is managed by the virtual machine monitor; and
   if the system call is fully managed by the virtual machine monitor, perform the service associated with the system call to generate the result and return the result to the process.

23. The computing apparatus of claim 21, wherein the processor is also to:
   execute a virtual machine monitor;
   determine whether the system call is partially managed by the virtual machine monitor; and
   if the system call is partially managed by the virtual machine monitor, perform the service to generate a partial result and pass the partial result and the system call to the guest operating system.

24. The computing apparatus of claim 19, wherein the processor is also to:
   execute a virtual machine monitor;
   pass the system call to a guest operating system of the virtual machine, the guest operating system to perform a service requested by the system call and to pass a result to the process;
   modify the process or a process environment of the process so that when the process receives the result, the process passes at least one of the system call and the result back to the virtual machine monitor; and
   perform an other service in response to receiving the system call or the result.

25. The computing apparatus of claim 24, wherein performing the other service comprises modifying the received result, and wherein the processor is also to pass the modified result to the process.

26. The computing apparatus of claim 19, wherein the system call attempts to execute a privileged or illegal instruction.

27. The computing apparatus of claim 19, wherein the processor is also to:
   modify the process or a process environment of the process so that a next action of the process will cause another software generated trap.

* * * * *